Patented Sept. 7, 1943

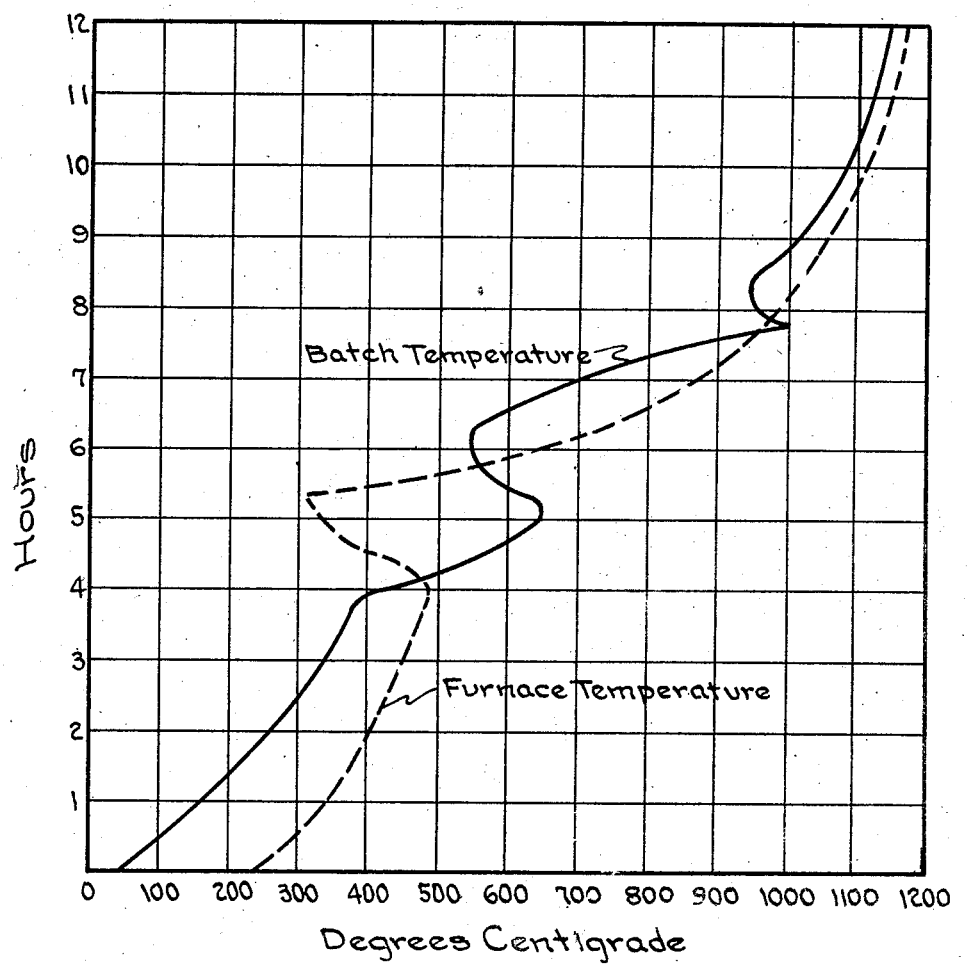

2,329,161

UNITED STATES PATENT OFFICE 2,329,161

MANUFACTURE OF CALCIUM ANTIMONATE

Carl J. Harbert, Shaker Heights, and Lester A. Bateman, East Cleveland, Ohio, assignors to The Harshaw Chemical Company, Elyria, Ohio, a corporation of Ohio Application November 4, 1940, Serial No. 364,118

5 Claims. (Cl. 23—53)

This invention relates to the manufacture of calcium antimonate ($CaSb_2O_6$) and has for its object the production of this compound in a form suitable for pigment use.

We have discovered that $CaSb_2O_6$ in light, fluffy, white powder form suitable for use as a ceramic pigment can be produced by heating together, in an oxidizing atmosphere and according to a suitable temperature cycle, antimony trioxide and a source of CaO from the class of materials consisting of CaO, $Ca(OH)_2$, $CaCO_3$ and mixtures thereof. Surprisingly, it is not necessary to incorporate an oxidizing agent into the batch.

In the accompanying drawing, the figure is a firing curve showing batch and furnace temperatures substantially as recorded for the batch of Example I. We have found this to be a typical firing curve. The thermocouple was placed about the middle of the sagger.

In the preferred practice of the invention, theoretical proportions of the materials are thoroughly mixed in the form of finely divided, dry powders and placed in saggers. The saggers are heated under oxidizing conditions to a temperature high enough to initiate an exothermic reaction. The temperature is kept below the melting point of $Sb_2O_3$ until little or no $Sb_2O_3$ remains. The temperature is then elevated to a point to initiate a second exothermic reaction. Calcination is then carried beyond this point for a time sufficient to produce a substantially neutral product. Considerable variations from this preferred practice are possible; however, it is highly desirable to oxidize the antimony to the tetravalent state (probably to $Sb_2O_4$ or $CaSb_2O_5$ or a mixture thereof) at a temperature below the melting point of $Sb_2O_3$ (656° C.) and then calcine at temperatures above that point (preferably from 700° C. to 1200° C. and most desirably at 1000° C. to 1200° C.) until the reaction is substantially complete, that is, until substantially all the antimony is present in the form of $CaSb_2O_6$.

We are not certain as to the precise mechanism of the reactions which occur, but we believe, referring to the accompanying drawing, that the sharp acceleration in the heating curve beginning at about 380° C. to 425° C. indicates oxidation of the antimony to the tetravalent state either as conversion of $Sb_2O_3$ to $Sb_2O_4$ or as a calcium compound of $Sb_2O_3$ to the corresponding calcium compound of $Sb_2O_4$, probably the former or in some degree both. The second sharp acceleration of the heating curve, reaching a maximum at 1000° C., we believe to indicate an oxidation of antimony, as oxide or calcium compound or both, to the pentavalent state. The sharp break occurring at 1000° C., we believe to result from the cooling effect of the decomposition of calcium carbonate which, at the maximum, just equals the exothermic effect of the oxidation of antimoy to the pentavalent state. Material calcined only to this maximum exhibited an alkaline reaction (pH 10.8), indicating unreacted CaO, and produced a yellowish enamel when used as a smelter addition opacifier, indicating unreacted $Sb_2O_5$. Upon further calcination, however, the pH went down and the color produced in enamel became less yellow until a point was reached at which the pH was approximately 6.0 and very white enamels were produced.

For best results, proportions should be substantially stoichiometric although considerable variation can be tolerated depending upon the use to which the material is to be put. Unreacted material simply contaminates the product and reduces its quality.

Time and temperature conditions are interdependent and also depedent upon the oxidizing character of the atmosphere of the kiln, the accessibility of all parts of the batch to the kiln atmosphere and the presence or absence of an oxidizing agent in the batch. Accordingly, the limits cannot be completely defined. However, a suitable firing cycle for any given set of conditions can be very readily determined, the essentials being conversion of trivalent antimony to tetravalent antimony at a temperature below the melting point of $Sb_2O_3$ followed by heating above the melting point of $Sb_2O_3$ until the reaction is complete, final temperature being desirably above 700° C. and preferably between 1000° C. and 1200° C. The end point is not sharp, but, in the case where stoichiometric proportions are used, can be determined by the pH of the product, approximate neutrality (pH 8.3 to 6.0) being, in that case, a good measure of completion of the reaction.

Superior to all other sources of calcium oxide for our purpose are mixtures of $Ca(OH)_2$ with $CaCO_3$. These mixtures possess the desirable physical properties for handling and give highly desirable results not produced by either in the absence of the other. If $Ca(OH)_2$ is reacted with an equimolecular proportion of $Sb_2O_3$, the reaction tends to go too fast at first and to liberate too much heat aand thereby to fuse some of the $Sb_2O_3$. If $CaCO_3$ is reacted with the equimolecular proportion of $Sb_2O_3$, the reaction is too much retarded in the early stages and, again, tends toward fusion of the unreacted $Sb_2O_3$. While these reactions can be controlled, it is somewhat difficult and expensive to do so. We have found, however, that a mixture of $Ca(OH)_2$ and $CaCO_3$ containing from 10% to 50% $Ca(OH)_2$ and preferably containing from 15% to 35% $Ca(OH)_2$ (percentages by weight) can be very easily controlled to give a very desirable product in the form of a light, fluffy, white powder suitable for use as an opaquing agent for vitreous enamels. The opaquing value of the resulting material is, in our experience, somewhat superior to that produced from either $Ca(OH)_2$ or $CaCO_3$ alone, possibly because of the better temperature control obtained.

For these mixtures of $Ca(OH)_2$ and $CaCO_3$, we prefer to bring the kiln temperature to about 400° C. and hold it there until the batch temperature has reached a point above 400° C., e. g. 450° C., indicating that the exothermic reaction has set in. We then cease heating the kiln, so that the kiln temperature drops somewhat during the reaction (batch temperature rising), and do not again start heating the kiln until the batch temperature has reached a maximum and started downwardly. We then apply heat again and preferably bring the temperature up to a maximum of from 1000 to 1200 degrees centigrade and hold it there for a time sufficient to complete the reaction, suitably 2 to 5 hours.

The proportions of reactants should be approximately theoretical for the formation of $CaO.Sb_2O_5$. Some variation can be tolerated. For best results, the proportions should be so selected that, upon completion of the reaction, the pH value of the final product is between 6.0 and 8.3, although passable results can be had at wider variations. Below 6.0 there is a tendency toward yellowness of the product, while above 8.3 a slight pink coloration is observed. In any event, the excess of either antimony oxide over base or base over antimony oxide should preferably not exceed $\frac{1}{10}$ mol per cent.

The following specific examples will serve to illustrate the invention:

*Example I*

Approximately 200.0 pounds of $Sb_2O_3$ were mixed dry with 11.55 pounds of $Ca(OH)_2$ and 50.4 pounds of $CaCO_3$. The batch was placed in saggers and heated according to the firing curve shown in the accompanying drawing, batch temperature being indicated by a full line and furnace temperature by a broken line. The resulting $CaSb_2O_6$ was a light, fluffy, white powder which proved to be somewhat superior to a commercial sodium antimonate as a smelter addition or mill addition opacifier for a vitreous enamel produced from a commercial antimony containing frit.

*Example II*

Approximately 200 pounds of $Sb_2O_3$ were reacted with 28.88 pounds of $Ca(OH)_2$ and 31.5 pounds of $CaCO_3$ approximately along the heating curve of Example I. The result was an excellent product but the temperature of the batch was not as easy to control on account of the use of the larger proportion of $Ca(OH)_2$.

*Example III*

Approximately 68.6 pounds of $CaCO_3$ and 200 pounds of $Sb_2O_3$ were mixed and calcined as in Example I. The product gave slightly lower total reflectance than the product of Example I in the same frit, but was an excellent opacifier. The total reflectance was about ½% lower than in the case of Example I.

*Example IV*

Approximately 53.3 pounds of $Ca(OH)_2$ were mixed with 200 pounds of $Sb_2O_3$ and the mixture calcined as in Example I. The product was a fairly good opacifier but there was an appreciable loss of antimony from melting of $Sb_2O_3$ at the bottom of the sagger.

Having thus described our invention, what we claim is:

1. A process of making calcium antimonate comprising heating a batch essentially consisting of $Sb_2O_3$ and a substance of the class consisting of CaO, $Ca(OH)_2$ and $CaCO_3$ in an oxidizing atmosphere at temperatures not substantially exceeding 656° C. until a major portion of the antimony has been oxidized beyond the trivalent state and then heating at a temperature above 656° C. until the reaction is substantially completed.

2. A process of making calcium antimonate comprising heating a batch essentially consisting of $Sb_2O_3$ and a substance of the class consisting of CaO, $Ca(OH)_2$ and $CaCO_3$ in an oxidizing atmosphere at temperatures not substantially exceeding 656° C. until a major portion of the antimony has been oxidized beyond the trivalent state and then heating at a temperature from 700° C. to 1200° C. until the reaction is substantially completed.

3. A process of making calcium antimonate comprising heating a batch essentially consisting of $Sb_2O_3$ and a substance of the class consisting of CaO, $Ca(OH)_2$ and $CaCO_3$ in an oxidizing atmosphere at temperatures not substantially exceeding 656° C. until a major portion of the antimony has been oxidized beyond the trivalent state and then heating at a temperature from 1000° C. to 1200° C. until the reaction is substantially completed.

4. In the manufacture of $CaSb_2O_6$ by reacting in the dry way finely divided material capable of yielding one mol of CaO with approximately one mol of finely divided $Sb_2O_3$ without including an oxidizing agent in the batch, initiating the reaction below 656° C. and maintaining the temperature below that point until a major portion of the antimony has been oxidized above the trivalent state and then elevating the temperature and completing the reaction above that point.

5. A process according to claim 4 further characterized in that said material capable of yielding CaO is a mixture of $Ca(OH)_2$ and $CaCO_3$, the $Ca(OH)_2$ amounting to from 10% to 50% of the combined weight of $Ca(OH)_2$ and $CaCO_3$.

CARL J. HARBERT.
LESTER A. BATEMAN.